United States Patent
Lee et al.

(10) Patent No.: US 12,272,333 B2
(45) Date of Patent: Apr. 8, 2025

(54) TILING DISPLAY APPARATUS

(71) Applicant: LG DISPLAY CO., LTD., Seoul (KR)

(72) Inventors: Ho Bum Lee, Paju-si (KR); Dae Sung Park, Paju-si (KR); Tae Gung Kim, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/436,104

(22) Filed: Feb. 8, 2024

(65) Prior Publication Data

US 2024/0177686 A1 May 30, 2024

Related U.S. Application Data

(63) Continuation of application No. 17/976,768, filed on Oct. 29, 2022.

(30) Foreign Application Priority Data

Dec. 31, 2021 (KR) .......................... 10-2021-0194683

(51) Int. Cl.
  *G09G 5/00* (2006.01)
  *G06F 3/14* (2006.01)
  *G09G 5/14* (2006.01)

(52) U.S. Cl.
  CPC ........... *G09G 5/003* (2013.01); *G06F 3/1446* (2013.01); *G09G 2370/045* (2013.01)

(58) Field of Classification Search
  None
  See application file for complete search history.

(56) References Cited

U.S. PATENT DOCUMENTS

| | | | |
|---|---|---|---|
| 2018/0165051 A1* | 6/2018 | Kim | G09G 5/14 |
| 2018/0166615 A1 | 6/2018 | Takagishi | |
| 2022/0188057 A1 | 6/2022 | Park et al. | |
| 2022/0188058 A1 | 6/2022 | Kim et al. | |
| 2023/0004338 A1* | 1/2023 | Slade | G06F 3/1454 |
| 2023/0282156 A1* | 9/2023 | Wong | G09G 3/32 |
| | | | 345/690 |

FOREIGN PATENT DOCUMENTS

EP  4016278 A1  6/2022

OTHER PUBLICATIONS

Taiwanese Office Action dated May 30, 2024 issued in Patent Application No. 113113027 w/English Translation (8 pages).
UK Search Report dated Feb. 9, 2023 issued in Patent Application No. GB 2214963.7 (4 pages).

* cited by examiner

*Primary Examiner* — Carl Adams
(74) *Attorney, Agent, or Firm* — Fish & Richardson P.C.

(57) ABSTRACT

A tiling display apparatus includes a set board configured to generate a control command signal and a plurality of display modules connected to one another through a first interface circuit based on a serial communication scheme, for executing a target operation corresponding to the control command signal, and the first interface circuit is implemented with a bidirectional serial interface having a feedback loop type between adjacent display modules of the plurality of display modules.

7 Claims, 21 Drawing Sheets

TILING DISPLAY APPARATUS

CROSS-REFERENCE TO RELATED APPLICATIONS

This application is a continuation of U.S. patent application Ser. No. 17/976,768, filed on Oct. 29, 2022, which claims the priority of the Korean Patent Application No. 10-2021-0194683 filed on Dec. 31, 2021, which are hereby incorporated by reference in their entirety.

BACKGROUND

Field of the Disclosure

The present disclosure relates to a tiling display apparatus capable of expanding.

Description of the Background

Large-sized displays may be used in various fields such as indoor and outdoor digital advertisements. To satisfy the demands for large-sized displays, tiling display apparatuses capable of being expanded have been proposed. In tiling display apparatuses, a single screen is configured by connecting a plurality of display modules, and a desired screen size may be implemented by adjusting the number of display modules connected to one another.

In such tiling display apparatuses, because a plurality of display modules are connected to one another at a long distance, reliability and speed of data communication may be reduced and synchronization between a clock and data may be difficult, thereby causing a reduction in data reliability.

SUMMARY

To overcome the aforementioned problem described above, the present disclosure is to provide a tiling display apparatus for performing massive communication having a fast data communication speed and high reliability and a driving method of the tiling display apparatus.

To achieve these and other advantages and in accordance with the purpose of the disclosure, as embodied and broadly described herein, a tiling display apparatus includes a set board configured to generate a control command signal and a plurality of display modules connected to one another through a first interface circuit based on a serial communication scheme, for executing a target operation corresponding to the control command signal, wherein the first interface circuit is implemented with a bidirectional serial interface having a feedback loop type between adjacent display modules of the plurality of display modules.

BRIEF DESCRIPTION OF THE DRAWINGS

The accompanying drawings, which are included to provide a further understanding of the disclosure and are incorporated in and constitute a part of this application, illustrate various aspects of the disclosure and together with the description serve to explain the principle of the disclosure.

DETAILED DESCRIPTION

Figure 1:
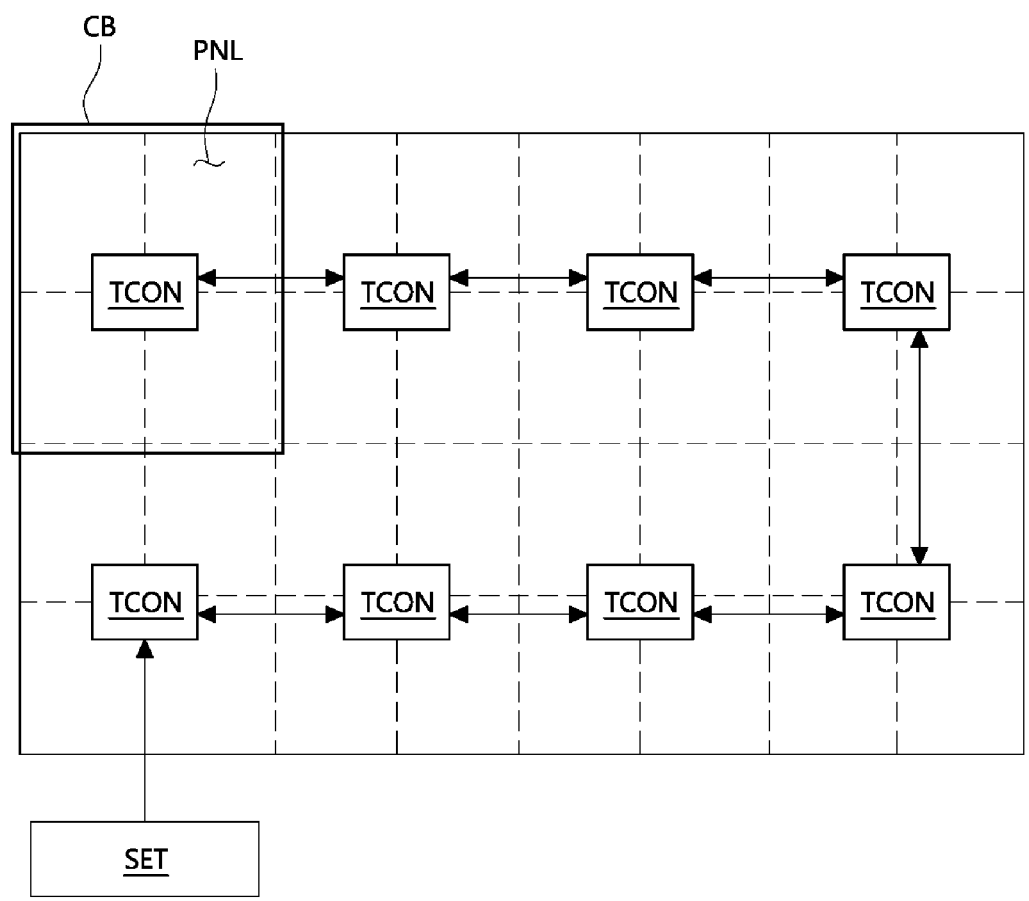
FIG. 1 is a diagram schematically illustrating a tiling display apparatus according to an aspect of the present disclosure.

Hereinafter, the present disclosure will be described more fully with reference to the accompanying drawings, in which exemplary aspects of the disclosure are shown. The disclosure may, however, be embodied in many different forms and should not be construed as being limited to the aspects set forth herein; rather, these aspects are provided so that this disclosure will be thorough and complete, and will fully convey the concept of the disclosure to those skilled in the art.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various aspects of the present disclosure to describe aspects of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts may be added unless the term "only" is used. As used herein, the singular forms "a", "an", and "the" are intended to include the plural forms as well, unless context clearly indicates otherwise.

Elements in various aspects of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, aspects of the present disclosure will be described in detail with reference to the accompanying drawings.

Figure 2:
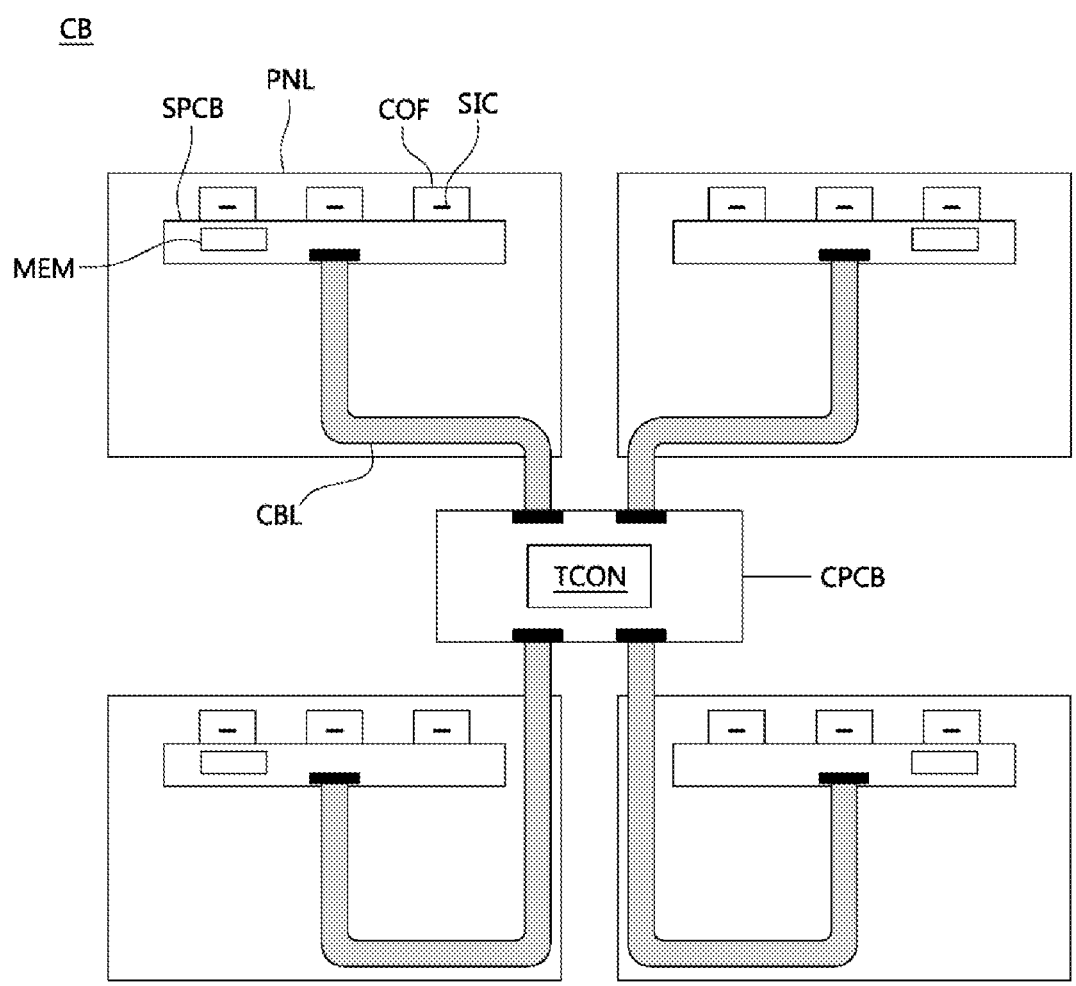
FIG. 2 is a diagram illustrating a connection configuration of a display module.

FIG. 1 is a diagram schematically illustrating a tiling display apparatus 100 according to an aspect of the present disclosure. FIG. 2 is a diagram illustrating a connection configuration of a display module.

Referring to FIGS. 1 and 2, the tiling display apparatus 100 according to an aspect of the present disclosure may include a set board SET and a plurality of display modules CB. Each of the display modules CB may be referred to as a cabinet.

The display modules CB may be connected to one another through a serial interface circuit to configure a large screen. A total resolution of the large screen may be determined as a total sum of unit resolutions of each display module CB. For example, in a case where a screen is configured by eight display modules having a unit resolution of 960*1080, a total resolution of the screen may be 3840*2160.

Each display module CB may be implemented as an electroluminescent display type or a liquid crystal display type, and in the following aspects, it is illustrated that the display module CB is implemented as electroluminescent display type based on a micro light emitting diode (LED). However, the spirit of the present disclosure is not limited by an implementation type of the display module CB.

The display modules CB may be connected to one another through a first interface circuit based on a bidirectional serial communication scheme, to execute a target operation corresponding to a control command signal input from the set board SET. The first interface circuit may be implemented as a bidirectional multi chain interface having a feedback loop type between adjacent display modules CB.

Individual bidirectional serial communication may be performed between the display modules CB by the first interface circuit, and thus, a short communication line may be secured and the reliability and speed of massive data communication performed through a short communication line may be enhanced.

A first display module CB of the display modules CB may be connected to the set board SET through a second interface circuit. The second interface circuit may be implemented as a unidirectional serial interface for connection compatibility with the set board SET. However, the second interface circuit may be implemented as a bidirectional serial interface so that a communication speed between the set board SET and the first display module CB increases.

The first interface circuit may be implemented as a bidirectional dual serial peripheral interface (SPI), and the second interface circuit may be implemented as a unidirectional single SPI. The first interface circuit and the second interface circuit may be implemented by wire or wirelessly.

Particularly, in the first interface circuit (i. e., the bidirectional dual SPI), each SPI may use only unidirectional TX (SCLK, MOSI, and SS) to reliably transmit massive data. Based on such a characteristic, a wireless scheme may be efficiently applied without considering a delay difference between RX (MISO) and TX (SCLK, MOSI, and SS).

Each display module CB may include a plurality of display panels PNL, a plurality of panel driving circuits for driving the display panels PNL, and a timing controller TCON which control operation timings of the panel driving circuits.

The timing controller TCON may be connected to one or more of the first interface circuit and the second interface circuit. A timing controller TCON included in a first display module of the display modules CB may be connected to the set board SET through the second interface circuit and may be connected to an adjacent display module through the first interface circuit. A timing controller TCON included in each of the other display modules CB except the first display module may be connected to an adjacent display module through the first interface circuit.

The timing controller TCON of each display module CB may be mounted on a control printed circuit board CPCB and may be connected to panel driving circuits of a corresponding display module CB through a branch cable CBL in parallel.

The panel driving circuit may be independently included in each of the plurality of display panels PNL configuring the same display module CB. The panel driving circuit may include a source printed circuit board SPCB connected to the timing controller TCON through the cable CBL, a memory circuit MEM mounted on the source printed circuit board SPCB, a conductive film COF electrically connecting the source printed circuit board SPCB to the display panel PNL, a data driver SIC bonded to the conductive film COF, and a gate driver and a power circuit electrically connected to the source printed circuit board SPCB.

The memory circuit MEM may be a non-volatile memory which stores panel characteristic information and may be flash memory and/or electrically erasable programmable read-only memory (EEPROM). The panel characteristic information may include a correction value for gamma setting, a first compensation value for compensating for a driving characteristic deviation/color deviation between pixels, a second compensation value for compensating for a boundary deviation between adjacent display panels PNL, various image qualities, and driving control data. In the panel characteristic information, a high amount of data may be stored in flash memory, and a low amount of data may be stored in EEPROM.

The timing controller TCON may operate the panel driving circuit on the basis of a control command signal received through a control interface circuit such as a serial peripheral interface (SPI) to execute a target operation corresponding to the control command signal, and thus, may generate a control response signal including an execution result of the target operation. The target operation may include reset, mute (dark change), average picture level (APL) range change, gamma change, image quality compensation value update, and firmware update. The target operation may further include an operation of writing and storing control command data in a specific memory and an operation of reading the control execution data from the specific memory. The control response signal may include control execution data and a check flag signal for transmission/reception error check, and thus, the reliability of an operation may increase.

Figure 3:
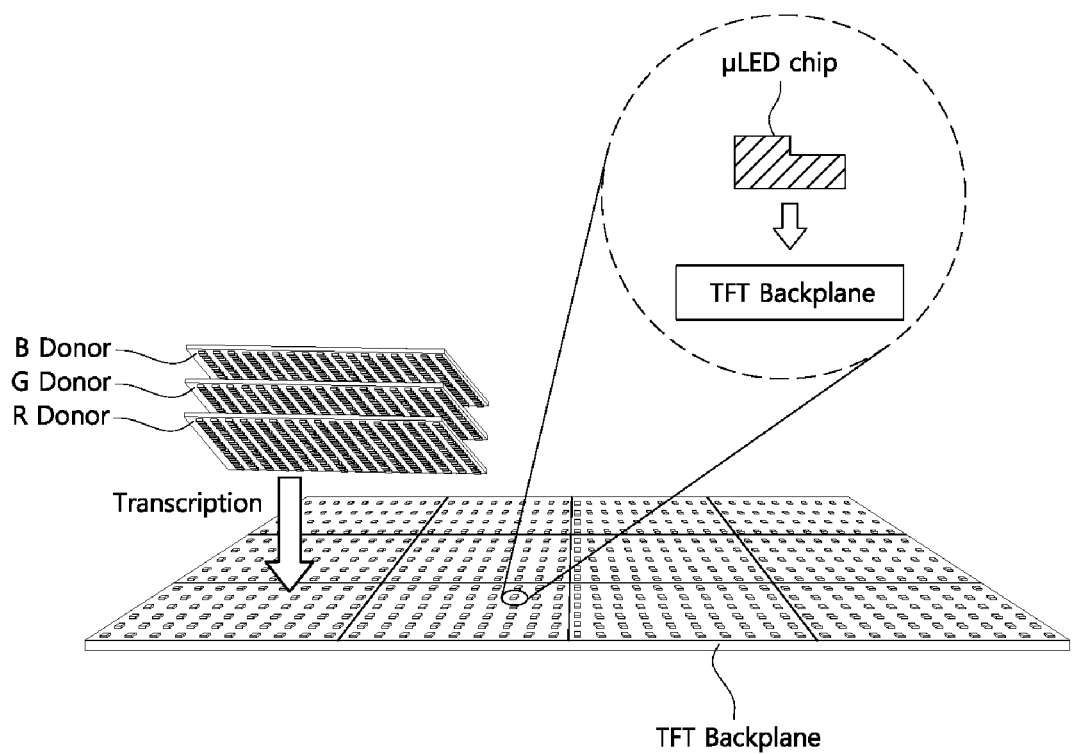
FIGS. 3 and 4 are diagrams illustrating a display panel based on a micro light emitting diode (LED)
Figure 4:
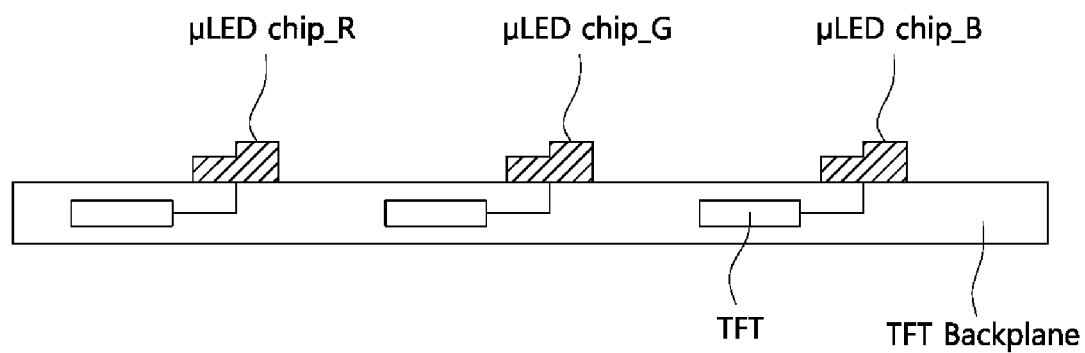
Figure 5:
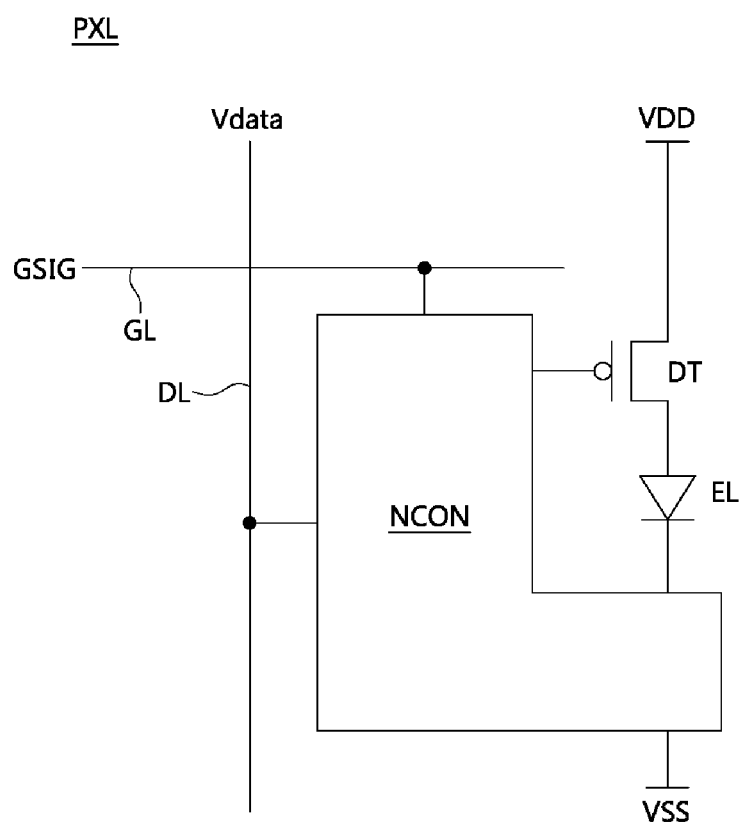
FIG. 5 is a schematic equivalent circuit diagram of a pixel included in a display panel.

FIGS. 3 and 4 are diagrams illustrating a display panel based on a micro light emitting diode (LED). FIG. 5 is a schematic equivalent circuit diagram of a pixel included in a display panel.

Referring to FIGS. 3 and 4, a pixel array for reproducing an input image may be provided in each of the display panels PNL. A plurality of pixels may be arranged in the pixel array, and signal lines for driving the pixels may be arranged in the pixel array. The signal lines may include a plurality of data lines DL for supplying data voltages Vdata to the pixels, a plurality of gate lines GL for supplying a gate signal GSIG to the pixels, and a plurality of power lines for supplying a source voltage to the pixels.

Each of the pixels may include a micro-LED chip (μLED chip) as a light emitting device EL. A plurality of micro-LED chips (μLED chip) may include red chips (μLED chip_R), green chips (μLED chip_G), and blue chips (μLED chip_B), which are disposed on a thin film transistor (TFT) backplane. A red (R) pixel may include a red chip (μLED chip_R) as a light emitting device EL, a green (G) pixel may include a green chip (μLED chip_G) as a light emitting device EL, and a blue (B) pixel may include a blue chip (μLED chip_B) as a light emitting device EL.

The micro-LED chips (μLED chip) may be transferred from R/G/B donors, and thus, may be mounted on a TFT backplane. The red chips (μLED chip_R) may be transferred from an R donor, the green chips (μLED chip_G) may be transferred from a G donor, and the blue chips (μLED chip_B) may be transferred from a B donor. Transfer technology may use an electrostatic force, a laser, a speed-dependent tacky force, and a load-dependent tacky force. The transfer technology is not limited thereto and may use self-assembly based on an electrostatic force.

The TFT backplane may be implemented in an active matrix structure for efficient driving. In the TFT backplane, the pixels may be defined by intersections between the data lines DL, the gate lines GL, and the power lines.

A plurality of pixels may configure one unit pixel. For example, R, G, and B pixels arranged adjacent thereto may configure one unit pixel in an extension direction of the gate line GL or an extension direction of the data line DL.

As in FIG. 5, a pixel PXL may include a light emitting device EL, a driving TFT DT, and a node circuit NCON.

The node circuit NCON may be connected to the gate line GL and the data line DL. The node circuit NCON may be supplied with the data voltage Vdata through the data line DL and may be supplied with the gate signal GSIG through the gate line GL. The node circuit NCON may apply the data voltage Vdata to a gate electrode of the driving TFT DT in synchronization with the gate signal GSIG, and thus, may set a gate-source voltage of the driving TFT DT on the basis of a condition for generating a driving current. The node circuit NCON may include an internal compensation circuit which senses a threshold voltage and/or electron mobility of the driving TFT DT to compensate for a gate voltage of the driving TFT DT.

The driving TFT DT may be a driving element which generates the driving current on the basis of the gate-source voltage thereof. The gate electrode of the driving TFT DT may be connected to the node circuit NCON, a first electrode (a drain electrode) thereof may be connected to a high level pixel power VDD, and a second electrode (a source electrode) thereof may be connected to a light emitting device EL.

The light emitting device EL may be a light emitting device which emits light having strength corresponding to the driving current input from the driving TFT DT. The light emitting device EL may be implemented with a micro-LED including an inorganic light emitting layer. A first electrode of the light emitting device EL may be connected to the driving TFT DT, and a second electrode thereof may be connected to a low level pixel power VSS.

A connection configuration and an operation of one pixel PXL may be merely an aspect, and the spirit of the present disclosure is not limited thereto. For example, each of the driving TFT DT and the node circuit NCON may be implemented based on a PMOS transistor, or may be implemented based on an NMOS transistor. Also, the gate line GL connected to the node circuit NCON may be provided in plurality.

Figure 6:
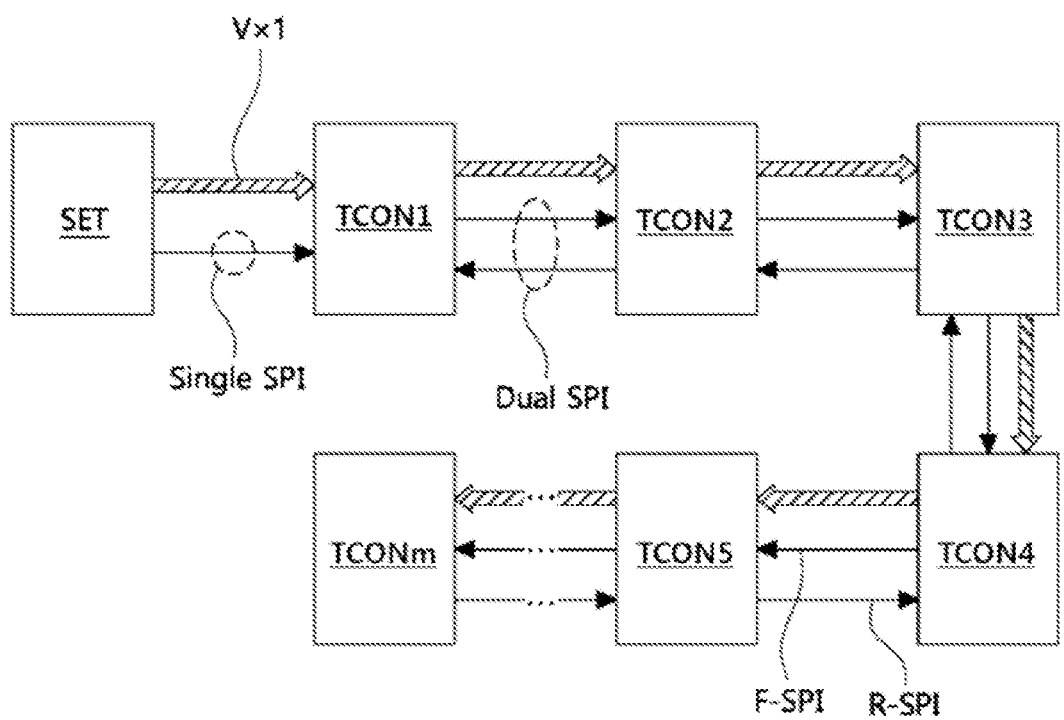
FIGS. 6 to 8 are diagrams illustrating a connection structure of a tiling display apparatus according to an aspect of the present disclosure.
Figure 7:
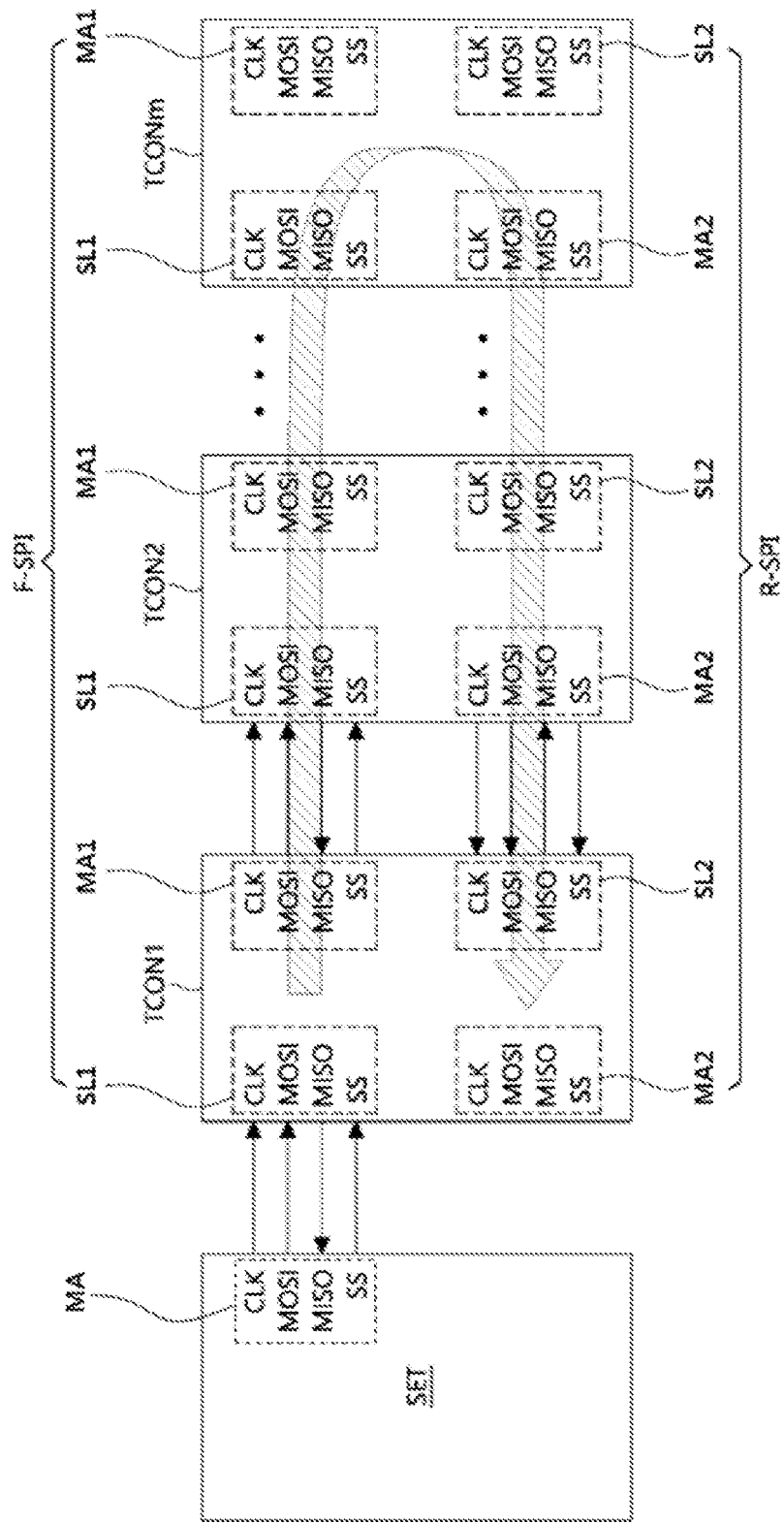
Figure 8:
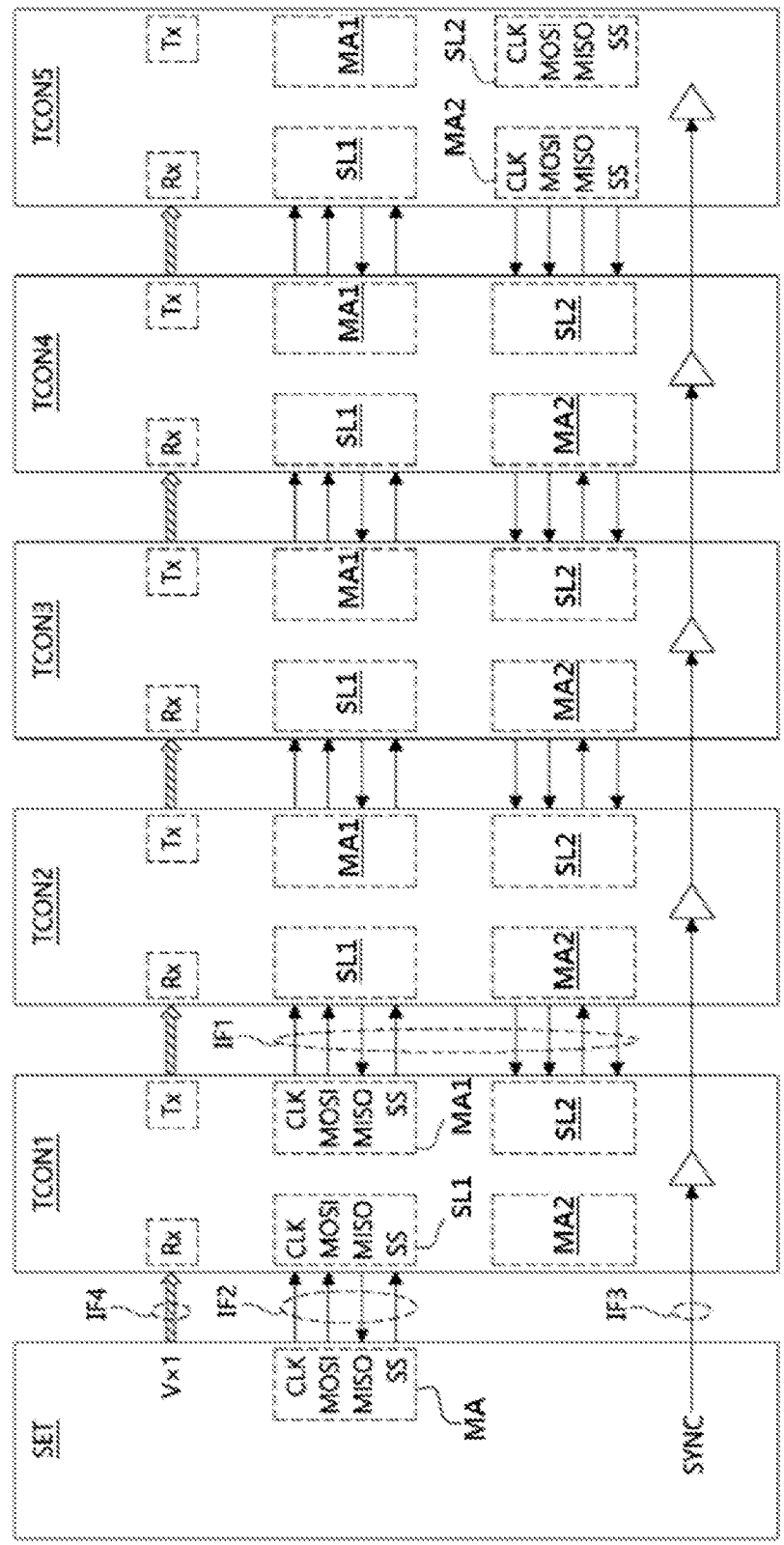

FIGS. 6 to 8 are diagrams illustrating a connection structure of a tiling display apparatus according to an aspect of the present disclosure.

Referring to FIGS. 6 to 8, a set board SET and a first timing controller TCON1 of a first display module may be connected to each other through a single SPI.

The single SPI may be a second interface circuit IF2 and may configure a unidirectional serial interface.

In the single SPI, a master may be the set board SET, and a slave may be the first timing controller TCON1. A master port MA of the set board SET may be connected to a first slave port SL1 of the first timing controller TCON1, and thus, the single SPI may be implemented.

A transmission/reception operation of the single SPI may be synchronized based on a clock CLK which is a master output. An attribute for setting a basic state of the clock CLK may be referred to as a clock polarity CPOL. An attribute for setting an edge, where data is to be transmitted, of the clock CLK may be referred to as a clock phase CPHA. For example, when CPOL or CPHA is logic low (0), data (i.e., a control command signal) may be transferred from the master port MA to the first slave port SL1 when the clock CLK is shifted from a low state to a high state (i.e., a rising edge of the clock). On the other hand, when CPOL or CPHA is logic high (1), data (i.e., the control command signal) may be transferred from the master port MA to the first slave port SL1 when the clock CLK is shifted from a high state to a low state (i.e., a falling edge of the clock).

A master output slave input MOSI of the single SPI may denote data (i.e., the control command signal) which is output from a master SET and is input to a slave TCON1, and a master input slave output MISO may denote data (i.e., a control response signal) which is output from the slave TCON1 and is input to the master SET. A slave selection SS of the single SPI may be a signal which selects the slave TCON1.

The master SET and the slave TCON1 may serially transmit or receive a data bit through a MOSI port. In data transferred from the master SET to the slave TCON1, a most significant bit may be first transferred. The slave TCON1 and the master SET may serially transfer and receive a data bit therebetween through the MOSI port. In data transferred from the slave TCON1 to the master SET, a least significant bit may be first transferred.

Referring to FIGS. 6 to 8, first to $m^{th}$ timing controllers TCON1 to TCONm of first to $m^{th}$ display modules may be connected to one another through a dual SPI. The dual SPI may be a first interface circuit IF1 and may configure a bidirectional serial interface having a feedback loop type.

Each of the first to $m^{th}$ timing controllers TCON1 to TCONm may include a first mater port MA1, a first slave port SL1, a second mater port MA2, and a second slave port SL2, so that a dual SPI is implemented between the first to $m^{th}$ timing controllers TCON1 to TCONm.

The first mater port MA1 and the first slave port SL1 included in each of the first to $m^{th}$ timing controllers TCON1 to TCONm may be for transferring a control command signal to an adjacent timing controller through a forward SPI F-SPI.

The second mater port MA2 and the second slave port SL2 included in each of the first to $m^{th}$ timing controllers TCON1 to TCONm may be for transferring a control response signal to an adjacent timing controller through a reverse SPI R-SPI.

For example, in a forward SPI F-SPI between the first and second timing controllers TCON1 and TCON2, a master may be the first timing controller TCON1, and a slave may be the second timing controller TCON2. In this case, a first master port MA1 of the first timing controller TCON1 may be connected to a first slave port SL1 of the second timing controller TCON2 through the forward SPI F-SPI.

A master output slave input MOSI of the forward SPI F-SPI may denote data (i.e., a control command signal) which is output from the master TCON1 and is input to the slave TCON2. The data may be data transferred to a memory circuit MEM of a target slave and may bypass the slave TCON2. A master input slave output MISO may not be used in the forward SPI F-SPI.

The reason that the MISO is not used in the forward SPI F-SPI is because the MISO is not suitable for high-speed massive communication in a structure where a plurality of timing controllers TCON are serially connected to one another at a long distance. Data should be synchronized with the clock CLK to read the data through the MISO, and due to this, a speed may be slowed whenever the data passes through the timing controller TCON and it may be difficult to determine a time for reading data from a slave in a master despite communication between adjacent timing controllers TCON. On the other hand, a problem described above may be easily solved by transferring data from a master to a slave by using a MOSI of the reverse SPI R-SPI.

In a reverse SPI R-SPI between the first and second timing controllers TCON1 and TCON2, a master may be the second timing controller TCON2, and a slave may be the first timing controller TCON1. In this case, a second master port MA2 of the second timing controller TCON2 may be connected to a second slave port SL2 of the first timing controller TCON1 through the reverse SPI R-SPI. A master output slave input MOSI of the reverse SPI R-SPI may denote data (i.e., a control response signal) which is output from the master TCON2 and is input to the slave TCON1. The control response signal may be data which is read from a memory circuit MEM of a target slave, or may be a check flag signal for determining whether data (i.e., a control command signal) transferred to the forward SPI F-SPI is normal. The master input slave output MISO may not be used in the reverse SPI R-SPI. A slave selection SS of the reverse SPI R-SPI may be a signal for selecting the slave TCON1.

A set board SET may transfer a multi synchronization signal SYNC to the timing controllers TCON1 to TCONm through a separate third interface circuit IF3. The multi synchronization signal SYNC may be applied to an overlap communication scheme described below and may enable an execution time of a target operation to match in all display modules, thereby decreasing screen flickers caused by a communication time difference. The multi synchronization signal SYNC may be transferred to the timing controllers TCON1 to TCONm through the first and second interface circuits IF1 and IF2, and in this case, the third interface circuit IF3 may be omitted.

The set board SET may transfer image data, which is for implementing an input image, to the timing controllers TCON1 to TCONm through a separate fourth interface circuit IF4. The fourth interface circuit IF4 may be implemented based on a V-by-One (Vx1) scheme capable of high-speed and large-capacity interfacing, but is not limited thereto.

The dual SPI described above may not be replaced with V-by-One (Vx1) based on a feedback type. In the V-by-One (Vx1) based on the feedback type, when a problem occurs in one of the timing controllers TCON1 to TCONm, a feedback signal may not be transferred to a corresponding timing controller, and due to this, an error may occur in total communication. In the dual SPI according to the present aspect, normal communication may be performed in both directions up to a front-stage timing controller TCONn−1 of a timing controller TCONn where a problem occurs, and thus, a position of the timing controller TCONn where the problem occurs may be accurately detected. In this case, n may be a natural number which is greater than 1 and less than m.

Figure 9:
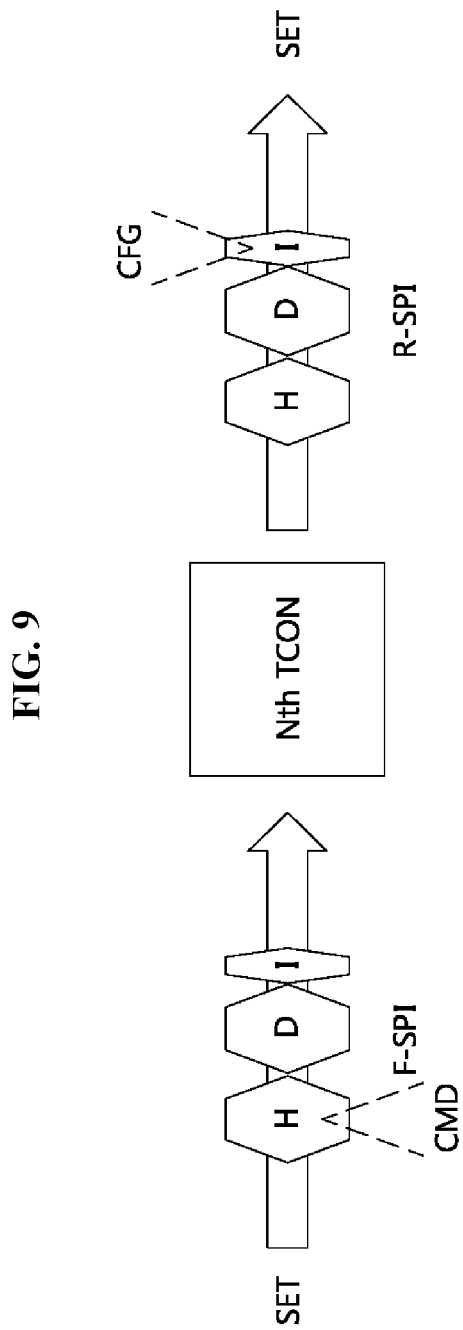
FIGS. 9 to 11 are diagrams illustrating an example of an operation of a tiling display apparatus according to an aspect of the present disclosure.
Figure 10:
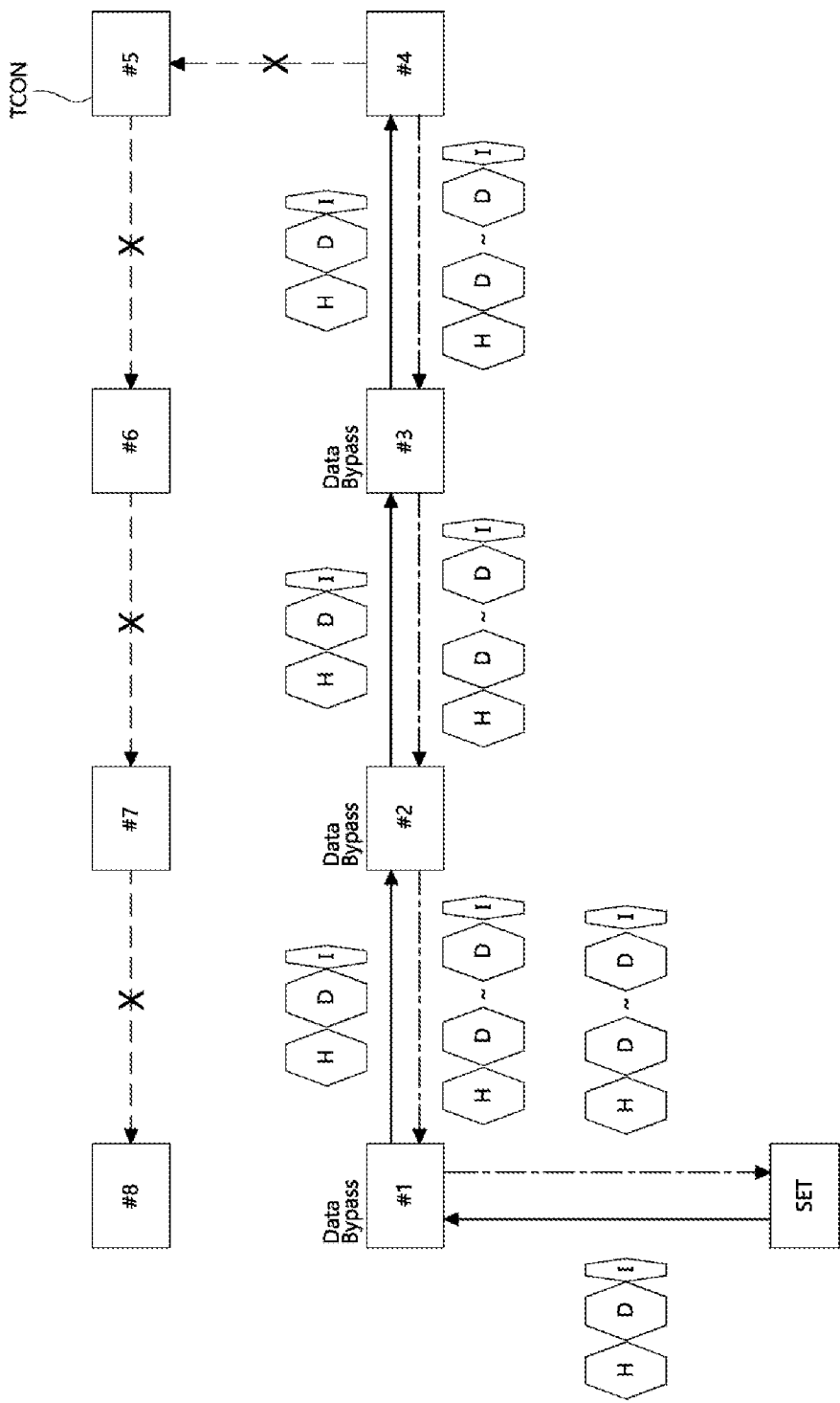
Figure 11:
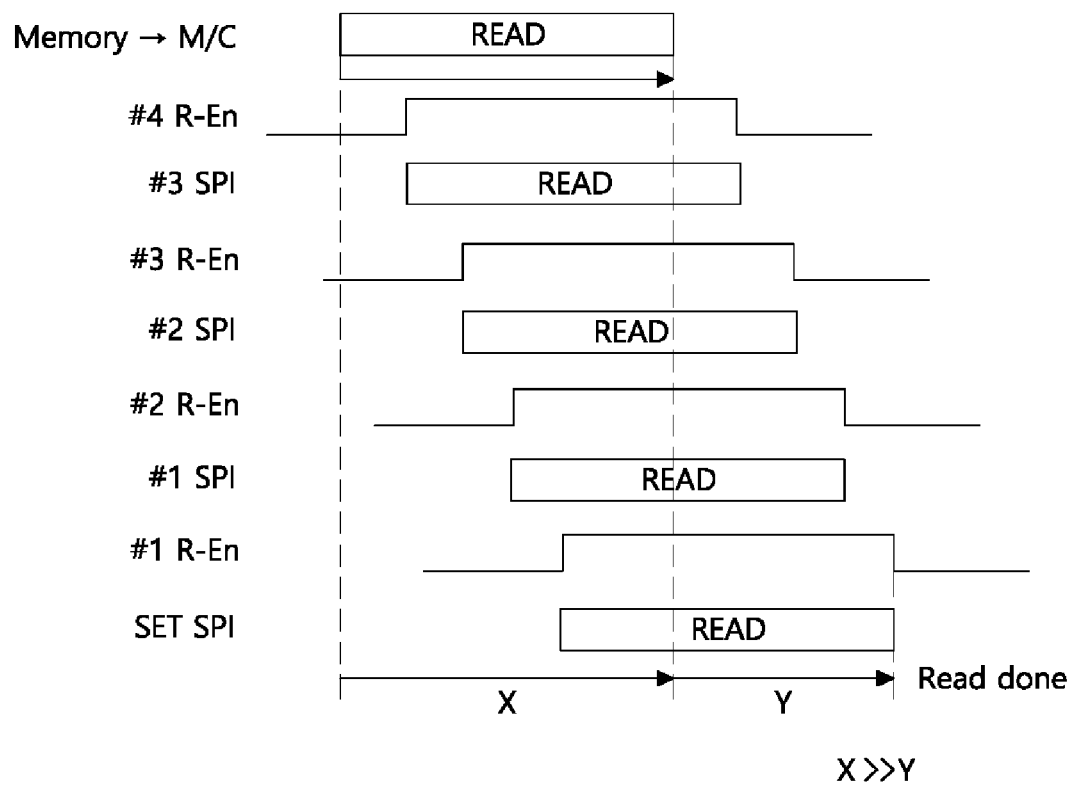

FIGS. 9 to 11 are diagrams illustrating an example of an operation of a tiling display apparatus according to an aspect of the present disclosure.

Referring to FIG. 9, a control command signal generated by a set board SET may be transferred to a timing controller Nth TCON of a target display module through a forward SPI F-SPI. A data transfer packet of the control command signal may be divided into a header region H, a data region D, and an information region I. The header region H may include position information about the target display module and a command signal CMD representing the kind of a control command (for example, a memory read command, a memory write command, a reset command, an automatic identification (ID) generating command, etc.). The data region D may include control command data. The information region I may include a check flag signal for transmission/reception error check.

Referring to FIG. 9, a control response signal generated by the timing controller Nth TCON of the target display module may be fed back to the set board SET through a reverse SPI R-SPI. A data transfer packet of the control response signal may be divided into a header region H, a data region D, and an information region I. The header region H may include position information about the target display module (a first timing controller or a set board) and an ACK command representing whether the command signal CMD is normal. The data region D may include control execution data (a value read from a specific memory circuit MEM). The information region I may include a check flag signal CFG for transmission/reception error check.

For example, as in FIGS. 10 and 11, the control command signal generated by the set board SET may bypass display modules #1 to #3 through a MOSI of the forward SPI F-SPI and may be transferred up to a display module #4 which is the target display module. Timing controllers TCON included in the display modules #1 to #3 may analyze a header region included in the control command signal to transfer the control command signal to an adjacent display module in a forward direction without executing the control command data.

A timing controller TCON included in the display module #4 may analyze a header region to execute the control command data, namely, may read information from a flash memory of the display module #4 and may store the read information in an arbitrary buffer, thereby generating a check flag signal. The read information and the check flag signal may be a control response signal.

The control response signal generated by the timing controller TCON included in the display module #4 may bypass the display modules #3 and #2 through a MOSI of a reverse SPI R-SPI and may be transferred up to the display module #1.

The set board SET may receive and store the control response signal from the display module #4 through a MISO of a second interface circuit (a single SPI) and may check the occurrence or not of an error in the check flag signal included in the control response signal. When an error does not occur in the check flag signal, a control process may end.

In FIG. 11, "M/C" may represent a memory controller, and "R-EN" may represent a read enable signal. In FIG. 11, "Y" may be a time which is shorter than "X", and thus, a burst data read instruction may be transferred and executed between a set board SET and a target display module #4. A communication time for the burst data read instruction may be almost equal through a bypass operation regardless of a position of the target display module. As seen through such an example, even when a plurality of display modules are disposed between the set board SET and the target display module #4, the communication time may be considerably reduced by the bypass operation.

Figure 12:
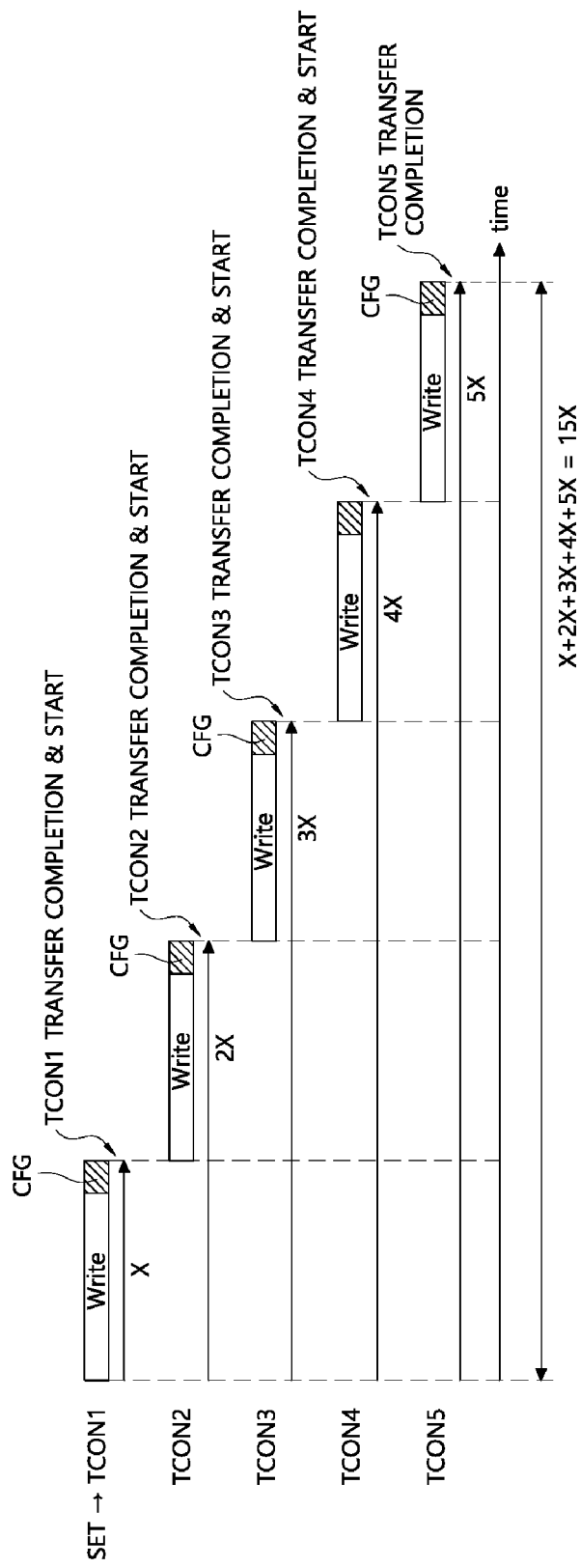
FIG. 12 is a diagram illustrating an operation of a tiling display apparatus in a basic communication mode according to an aspect of the present disclosure.

FIG. 12 is a diagram illustrating an operation of a tiling display apparatus in a basic communication mode according to an aspect of the present disclosure.

Referring to FIG. 12, in a basic communication mode, a set board SET may individually check a communication result (i.e., a check flag signal CFG) from each of timing controllers TCON1 to TCON4 one by one, and then, may again perform a next-order timing controller (one of timing controllers TCON2 to TCON5).

In the basic communication mode, when memory data is to be changed for the timing controllers TCON1 to TCON5, a total of communication time "15x" may be needed.

Figure 13A:
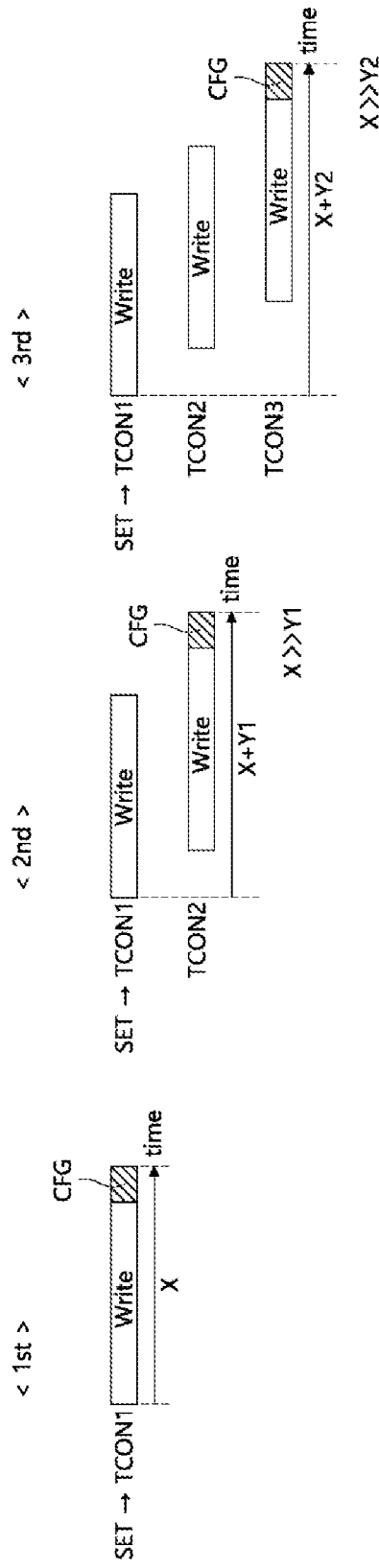
FIGS. 13A and 13B are diagrams illustrating an operation of a tiling display apparatus in a bypass communication mode according to an aspect of the present disclosure.
Figure 13B:
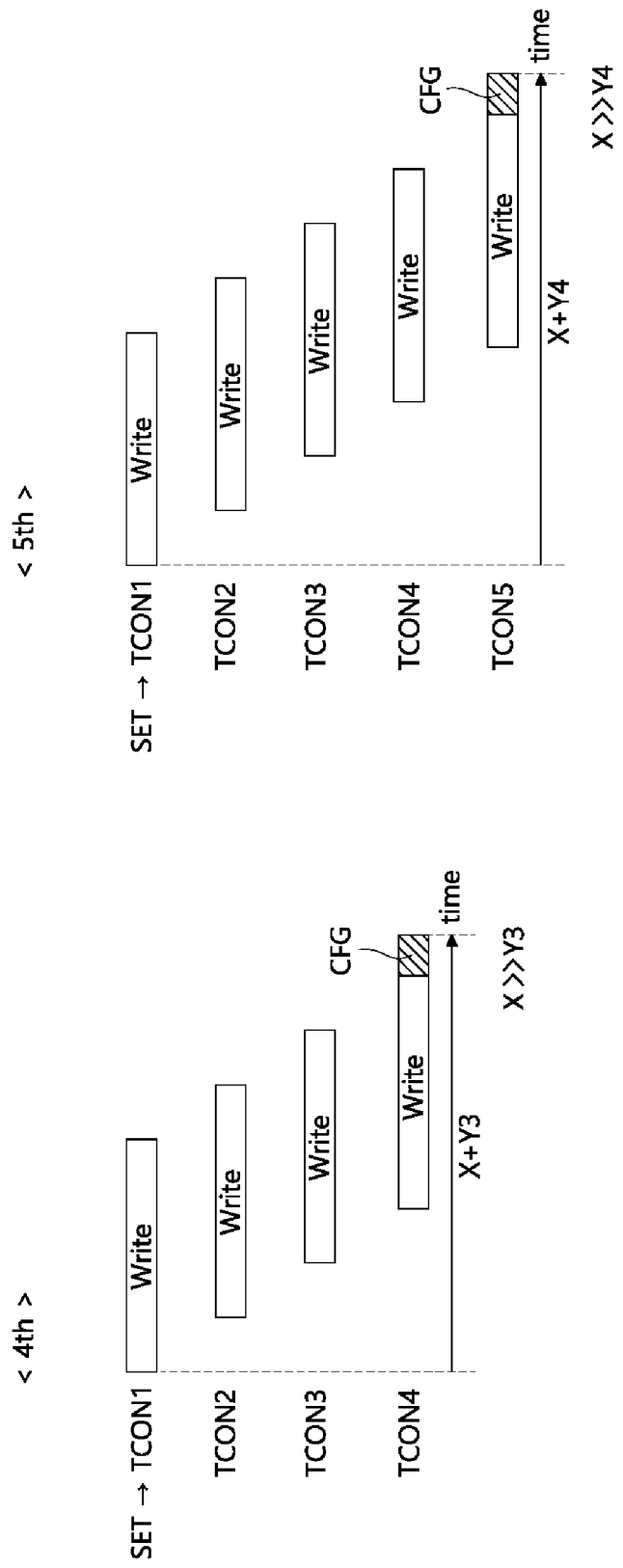

FIGS. 13A and 13B are diagrams illustrating an operation of a tiling display apparatus in a bypass communication mode according to an aspect of the present disclosure.

Referring to FIGS. 13A and 13B, in the bypass communication mode, a set board SET may sequentially change memory data of first to fifth display modules one by one through five bypass communications for each of timing controllers TCON1 to TCON5, and in this case, total communication may be completed for a relatively short time (for example, about 5x) on the basis of a bypass scheme.

The bypass scheme may be a scheme where a control command signal passes through one or more timing controllers connected to one another through a forward SPI and is quickly transferred to a target timing controller, and a control response signal (for example, a check flag signal CFG) generated by the target timing controller passes through one or more timing controllers connected to one another through a reverse SPI and is quickly fed back to a first timing controller TCON1.

One or more timing controllers which has transferred the control command signal may store and analyze only a header region of the control command signal and may transfer the control command signal to an adjacent timing controller in a forward direction without executing control command data. Likewise, one or more timing controllers which has transferred the control response signal may analyze only a header region of the control response signal and may feedback the control response signal to an adjacent timing controller in a reverse direction. When the control response signal is stored in a specific register of the first timing controller TCON1 through a feedback process, the set board SET may receive a control response signal of the specific register through a MISO of a single SPI. Also, in a case where the first timing controller TCON1 is connected to the set board SET through a dual SPI, the set board SET may receive the control response signal through a reverse MOSI of the dual SPI.

To provide a detailed description, the set board SET may change memory data of a first display module for the first timing controller TCON1 through first bidirectional communication and may receive a check flag signal CFG generated by the first timing controller TCON1, and in this case, a communication time taken therein may be "X".

The set board SET may change memory data of a second display module for the second timing controller TCON2 through second bidirectional communication and may receive a check flag signal CFG generated by the second timing controller TCON2, and in this case, a communication time taken therein may be "X+Y1". Here, "Y1" may be a time (i.e., header region analysis) taken in a bypass operation in the first timing controller TCON1 and may be far shorter than "X". Therefore, a time taken in the second bidirectional communication may be about "X". The first timing controller TCON1 may not generate the check flag signal CFG, and only the second timing controller TCON2 may generate the check flag signal CFG.

The set board SET may change memory data of a third display module for the third timing controller TCON3 through third bidirectional communication and may receive a check flag signal CFG generated by the third timing controller TCON3, and in this case, a communication time taken therein may be "X+Y2". Here, "Y2" may be a time (i.e., header region analysis) taken in a bypass operation in the first and second timing controllers TCON1 and TCON2 and may be far shorter than "X". Therefore, a time taken in the third bidirectional communication may be about "X". The first and second timing controllers TCON1 and TCON2 may not generate the check flag signal CFG, and only the third timing controller TCON3 may generate the check flag signal CFG.

The set board SET may change memory data of a fourth display module for the fourth timing controller TCON4 through fourth bidirectional communication and may receive a check flag signal CFG generated by the fourth timing controller TCON4, and in this case, a communication time taken therein may be "X+Y3". Here, "Y3" may be a time (i.e., header region analysis) taken in a bypass operation in the first to third timing controllers TCON1 to TCON3 and may be far shorter than "X". Therefore, a time taken in the fourth bidirectional communication may be about "X". The first to third timing controllers TCON1 to TCON3 may not generate the check flag signal CFG, and only the fourth timing controller TCON4 may generate the check flag signal CFG.

The set board SET may change memory data of a fifth display module for the fifth timing controller TCON5 through fifth bidirectional communication and may receive a check flag signal CFG generated by the fifth timing controller TCON5, and in this case, a communication time taken therein may be "X+Y4". Here, "Y4" may be a time (i.e., header region analysis) taken in a bypass operation in the first to fourth timing controllers TCON1 to TCON4 and may be far shorter than "X". Therefore, a time taken in the fifth bidirectional communication may be about "X". The first to fourth timing controllers TCON1 to TCON4 may not generate the check flag signal CFG, and only the fifth timing controller TCON5 may generate the check flag signal CFG.

As a result, in the bypass communication mode, a time taken in changing memory data for the first to fifth timing controllers TCON1 to TCON5 may be about "5×". Accordingly, comparing with the basis communication mode, the bypass communication mode may decrease a communication time and may increase a communication speed.

Figure 14:
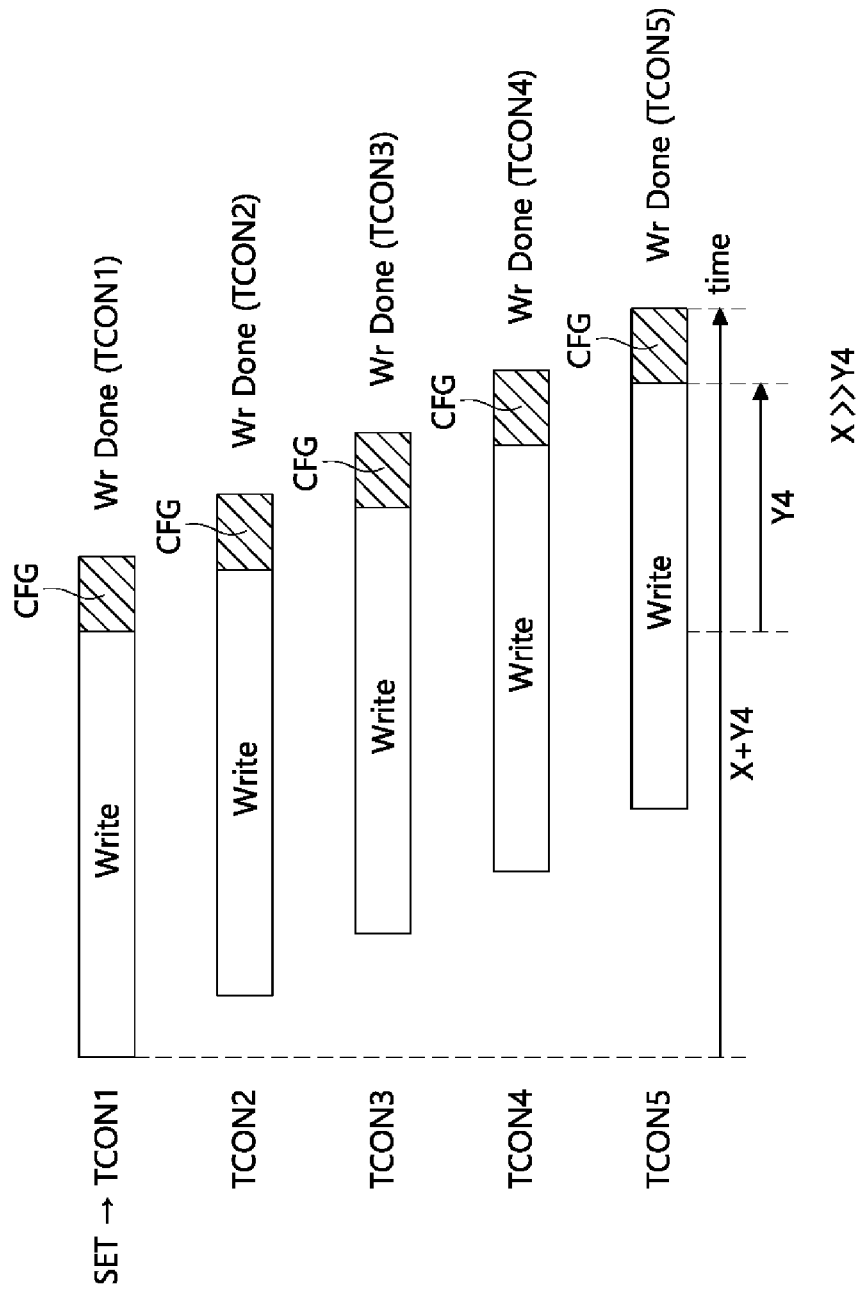
FIG. 14 is a diagram illustrating an operation of a tiling display apparatus in an asynchronous overlap communication mode according to an aspect of the present disclosure.

FIG. 14 is a diagram illustrating an operation of a tiling display apparatus in an asynchronous overlap communication mode according to an aspect of the present disclosure.

Referring to FIG. 14, in an asynchronous overlap communication mode, a set board SET may sequentially change memory data of first to fifth display modules through one bypass communication for all timing controllers TCON1 to TCON5, and thus, total communication may be completed within a very short time (for example, about X) through an asynchronous overlap communication scheme.

The asynchronous overlap communication scheme may be a scheme where a control command signal is quickly transferred to each of the timing controllers TCON1 to TCON5 through a forward SPI and a control response signal (for example, a check flag signal CFG) generated by each of the timing controllers TCON2 to TCON5 is quickly fed back to a first timing controller TCON1 through a reverse SPI.

Each of the timing controllers TCON1 to TCON4 may analyze a header region of the control command signal and may transfer the control command signal to an adjacent timing controller in a forward direction while storing control command data in a target memory. Each of the timing controllers TCON1 to TCON5 may generate the control response signal including an execution result of a control command. A control response signal (for example, a check flag signal CFG) may be transferred to an adjacent timing controller through the reverse SPI and updated, and then, may be fed back to the first timing controller TCON1. When all control response signals generated by the timing controllers TCON1 to TCON5 are stored in a specific register of the first timing controller TCON1 through a feedback process based on the update scheme, the set board SET may receive control response signals of the specific register through a MISO of a single SPI.

To provide a detailed description, the set board SET may change memory data of display modules for all of the timing controllers TCON1 to TCON5 through one bidirectional communication and may receive check flag signals CFG, generated by the timing controllers TCON1 to TCON5, from the first timing controller TCON1, and in this case, a communication time taken therein may be "X+Y4". Here, "Y4" may be a time (i.e., header region analysis) taken in a bypass operation in the timing controllers TCON1 to TCON4 and may be far shorter than "X". Therefore, a time taken in one bidirectional communication may be about "X".

As a result, in the asynchronous overlap communication mode, a time taken in changing memory data for the timing controllers TCON1 to TCON5 may be about "X". Accordingly, comparing with the basis communication mode, the asynchronous overlap communication mode may considerably decrease a communication time and may considerably increase a communication speed.

Figure 15:
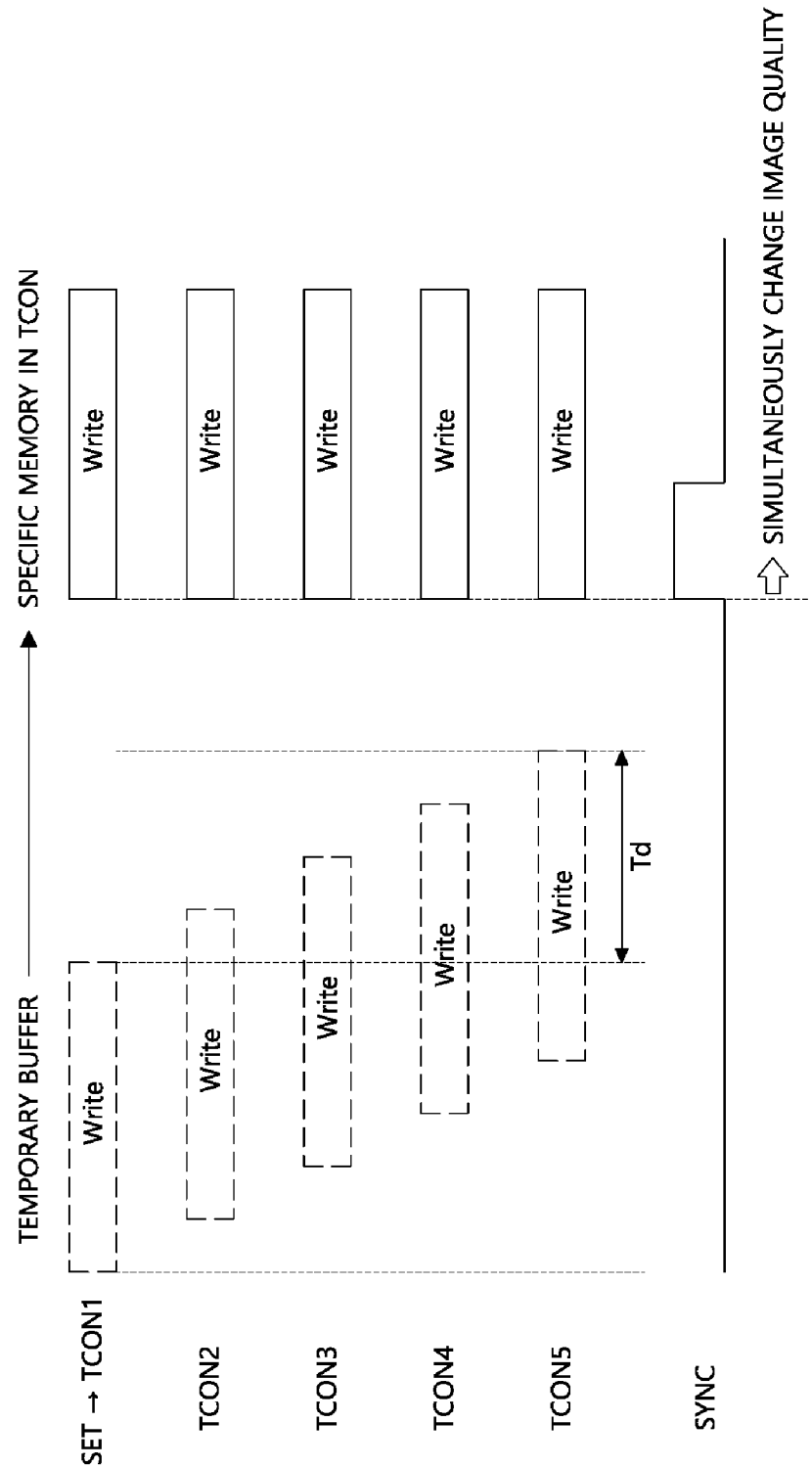
FIG. 15 is a diagram illustrating an operation when a check flag error occurs, in the bypass communication mode.
Figure 16:
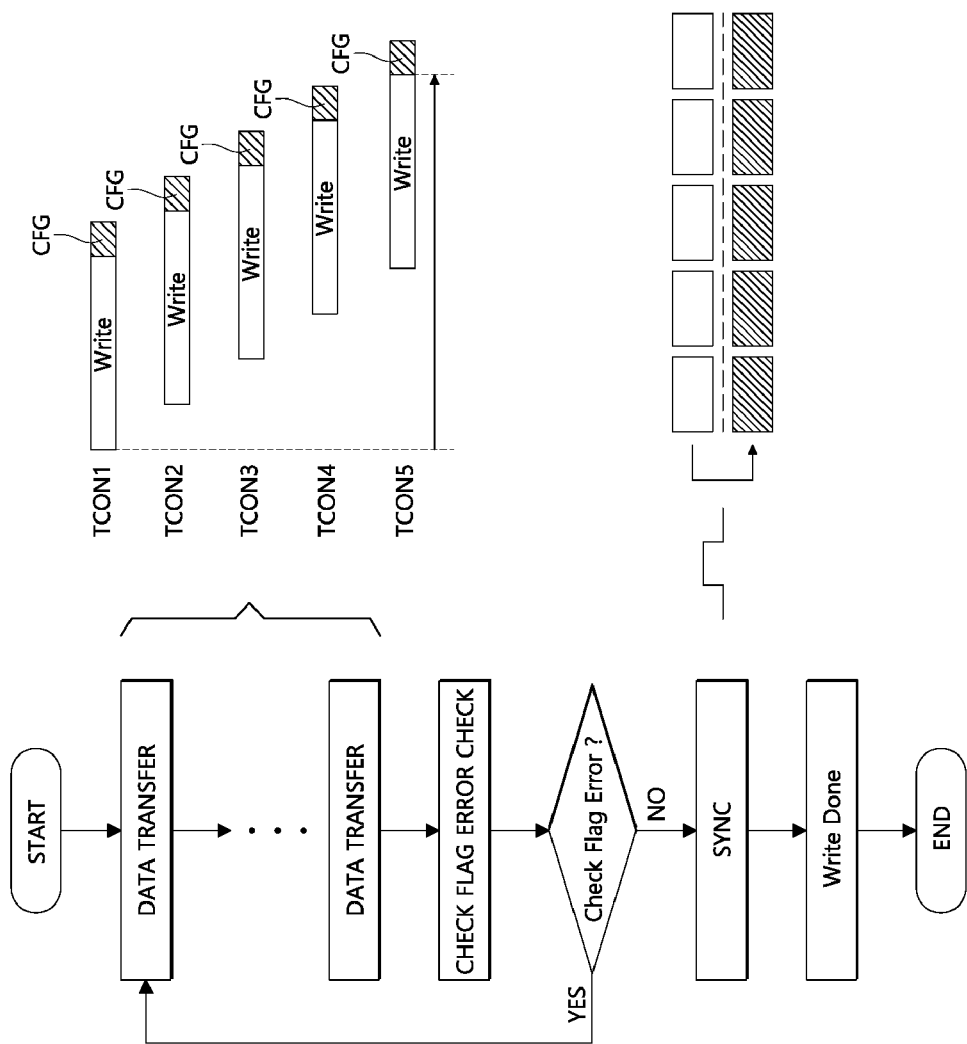
FIG. 16 is a diagram illustrating an operation when a check flag error occurs, in the asynchronous overlap communication mode.
Figure 17:
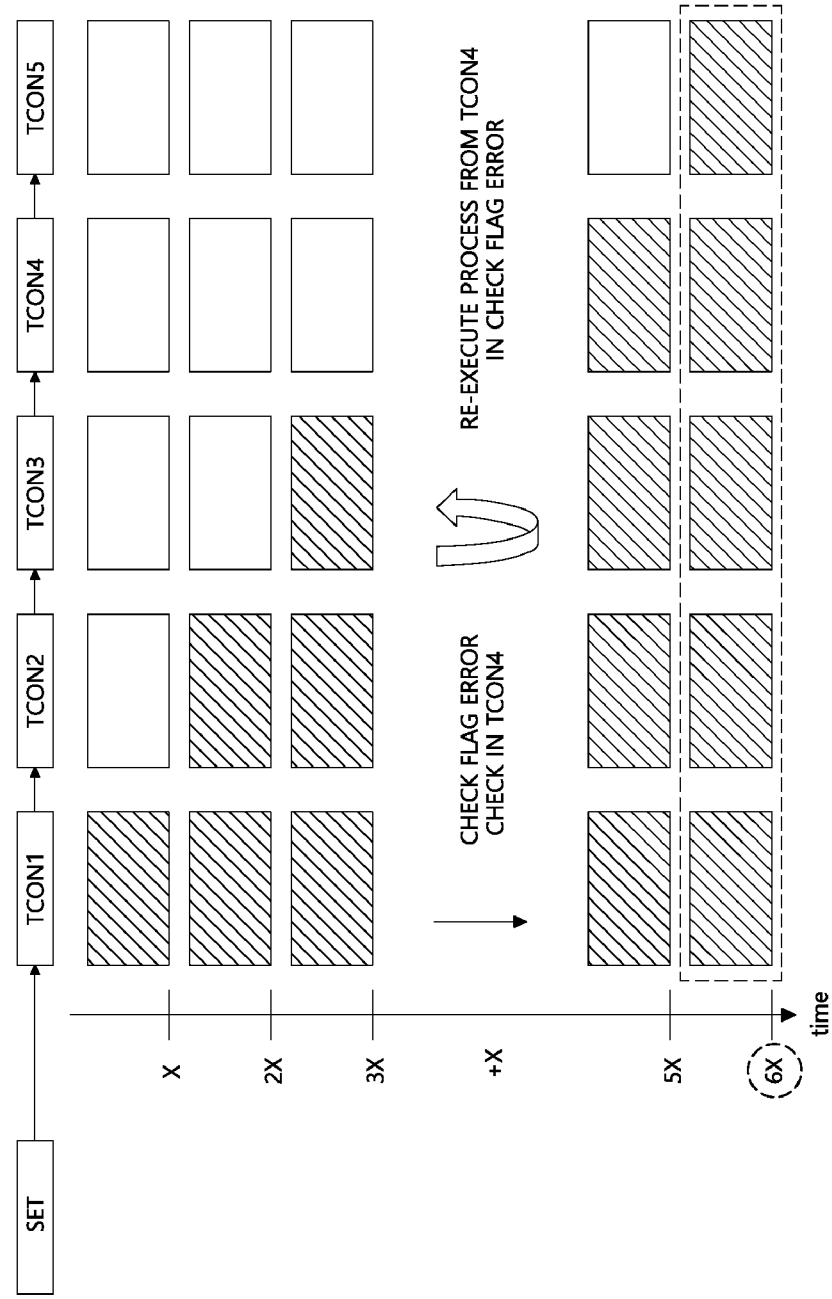
FIG. 17 is a diagram illustrating an operation when a check flag error occurs, in a synchronous overlap communication mode.

FIG. 15 is a diagram illustrating an operation when a check flag error occurs, in the bypass communication mode. FIG. 16 is a diagram illustrating an operation when a check flag error occurs, in the asynchronous overlap communication mode. FIG. 17 is a diagram illustrating an operation when a check flag error occurs, in a synchronous overlap communication mode.

In FIGS. 15 to 17, an obliquely-striped region may represent a screen of a display module where a control command (an APL & gamma change of a specific color) is executed, a white-illustrated region may represent a screen of a display module where the control command is not executed.

Referring to FIG. 15, in the bypass communication mode, because each of the timing controllers TCON1 to TCON5 is sequentially set to a target one by one, image qualities of first to fifth display modules may be sequentially changed. For example, in performing an operation in the bypass communication mode, when an error occurs in a check flag signal generated by a specific timing controller (for example, TCON4), a set board SET may again execute a bypass communication process from the timing controller TCON4 where an error occurs. In this case, a time taken in changing all of the image qualities of the first to fifth display modules may be about 6×.

In the bypass communication mode, because the image quality of the first to fifth display modules are sequentially changed, screen flickers caused by changing image quality may be recognized by eyes, and when an error of a check flag signal is repeated, continuous screen flickering may occur.

Referring to FIG. 16, in the asynchronous overlap communication mode, timing controllers TCON1 to TCON5 may be simultaneously set to a target, and image qualities of first to fifth display modules may be sequentially changed with a fine time difference. For example, in performing an operation in the asynchronous overlap communication mode, when an error occurs in a check flag signal generated by a specific timing controller (for example, TCON4), a set board SET may again execute an overlap communication process for the timing controllers TCON1 to TCON5. In this case, a time taken in changing all of the image qualities of the first to fifth display modules may be about 2×.

In the asynchronous overlap communication mode, because the image quality of the first to fifth display modules are sequentially changed with a fine time difference, screen flickers caused by changing image quality may not largely be inconvenient, but when an error of a check flag signal is repeated, continuous screen flickering may occur.

Referring to FIG. 17, in the synchronous overlap communication mode, timing controllers TCON1 to TCON5 may be simultaneously set to a target, and image qualities of first to fifth display modules may be simultaneously changed based on a multi synchronization signal SYNC. For example, in performing an operation in the synchronous overlap communication mode, when an error occurs in a check flag signal generated by a specific timing controller (for example, TCON4), a set board SET may again execute an overlap communication process for the timing controllers TCON1 to TCON5. In this case, a time taken in changing all of the image qualities of the first to fifth display modules may be about 2×.

In the synchronous overlap communication mode, a control command signal may be sequentially stored in temporary buffers of the first to fifth display modules with a fine time difference, and then, may be simultaneously updated in target memories of the first to fifth display modules on the basis of the multi synchronization signal SYNC. Therefore, because the image quality of the first to fifth display modules are simultaneously changed based on the multi synchronization signal SYNC, screen flickers caused by changing image quality may be prevented, but when an error of a check flag signal is repeated, continuous screen flickering may not occur.

Figure 18:
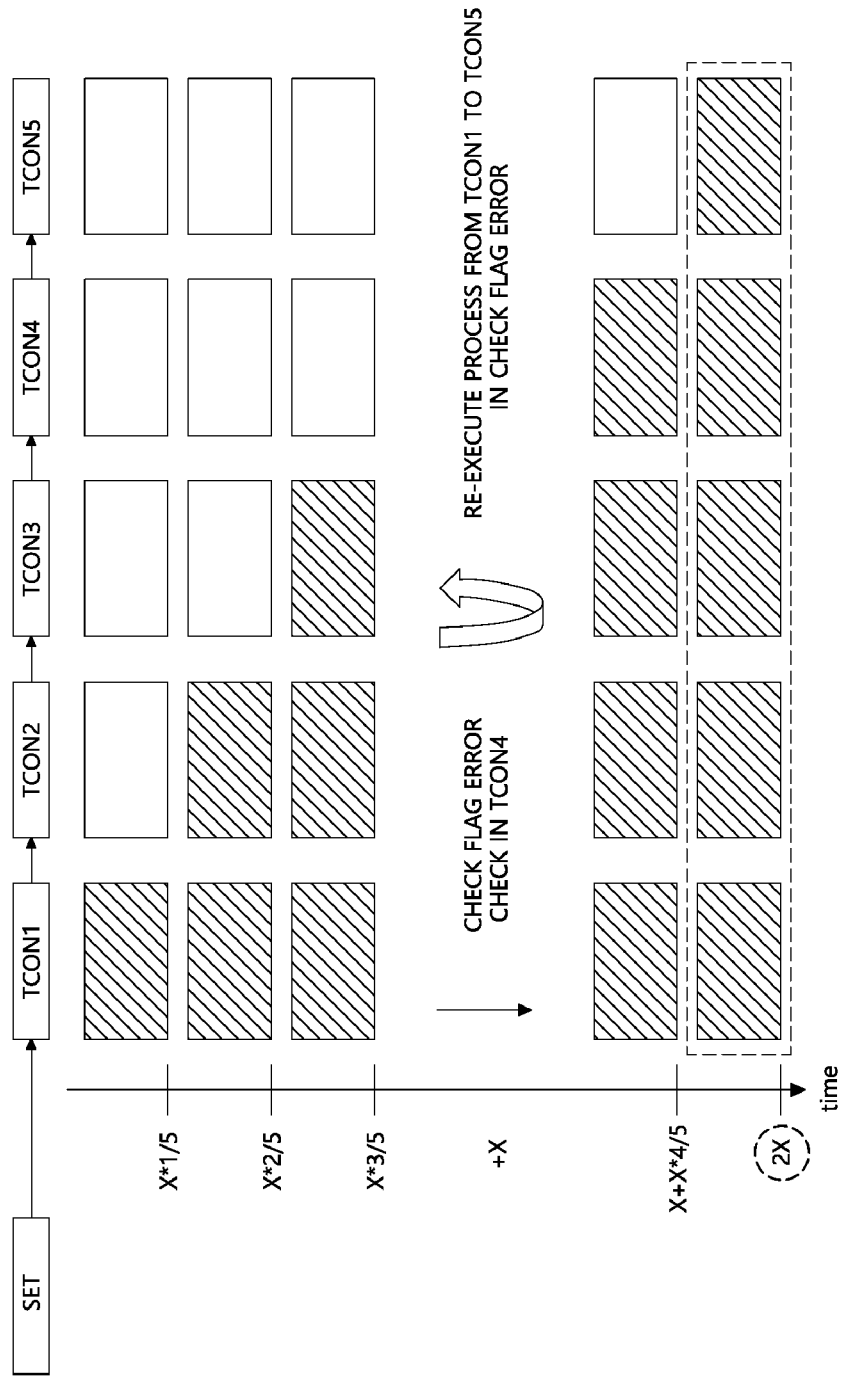
FIGS. 18 and 19 are diagrams illustrating an operation of a tiling display apparatus in the synchronous overlap communication mode according to an aspect of the present disclosure.
Figure 19:
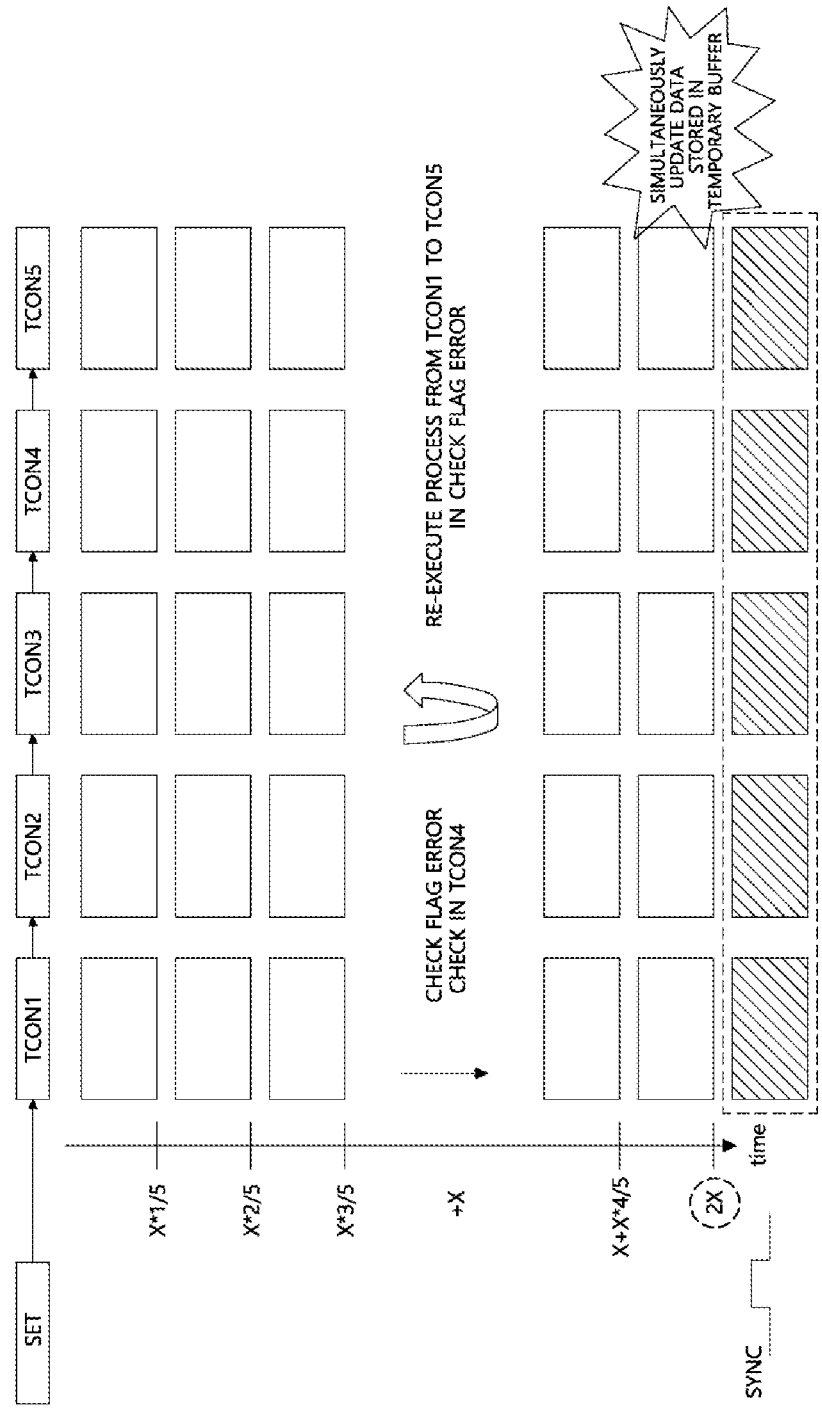

FIGS. 18 and 19 are diagrams illustrating an operation of a tiling display apparatus in the synchronous overlap communication mode according to an aspect of the present disclosure.

Referring to FIGS. 18 and 19, in the synchronous overlap communication mode, a set board SET may simultaneously change memory data of first to fifth display modules through one bypass communication for all timing controllers TCON1 to TCON5, and thus, total communication may be completed within a very short time (for example, about X) through a synchronous overlap communication scheme.

Comparing with the asynchronous overlap scheme, the synchronous overlap scheme may have a difference in that an execution time of a target operation corresponding to a control command signal is equal in first to fifth display modules in response to a multi synchronization signal SYNC transferred from a set board SET. To this end, in the synchronous overlap scheme, the timing controllers TCON1 to TCON5 may sequentially store the control command signal in a temporary buffer, and then, the control command signal may be simultaneously updated to target memories of the first to fifth display modules on the basis of the multi synchronization signal SYNC. According to the synchronous overlap scheme, there is an effect that screen flicker due to a time difference Td generated when control command signals are sequentially stored in the temporary buffer may be prevented.

Like the asynchronous overlap communication scheme, the synchronous overlap communication scheme may be a scheme where the control command signal is quickly transferred to each of the timing controllers TCON1 to TCON5 through a forward SPI and a control response signal (for example, a check flag signal CFG) generated by each of the timing controllers TCON2 to TCON5 is quickly fed back to a first timing controller TCON1 through the reverse SPI.

Each of the timing controllers TCON1 to TCON4 may analyze a header region of the control command signal and may transfer the control command signal to an adjacent timing controller in a forward direction while storing control command data in a temporary buffer. Each of the timing controllers TCON1 to TCON5 may generate the control response signal including an execution result of a control command. A control response signal (for example, a check flag signal CFG) may be transferred to an adjacent timing controller through the reverse SPI and updated, and then, may be fed back to the first timing controller TCON1. When all control response signals generated by the timing controllers TCON1 to TCON5 are stored in a specific register of the first timing controller TCON1 through a feedback process based on the update scheme, the set board SET may receive control response signals of the specific register through a MISO of a single SPI.

The set board SET may determine the occurrence or not of an error in the control response signals, and when there is no error, the multi synchronization signal SYNC may be transferred to the timing controllers TCON1 to TCON5. The timing controllers TCON1 to TCON5 may simultaneously update control command data, stored in the temporary buffer, in each specific memory on the basis of the multi synchronization signal SYNC, and thus, a control command may be simultaneously executed in the first to fifth display modules.

Figure 20:
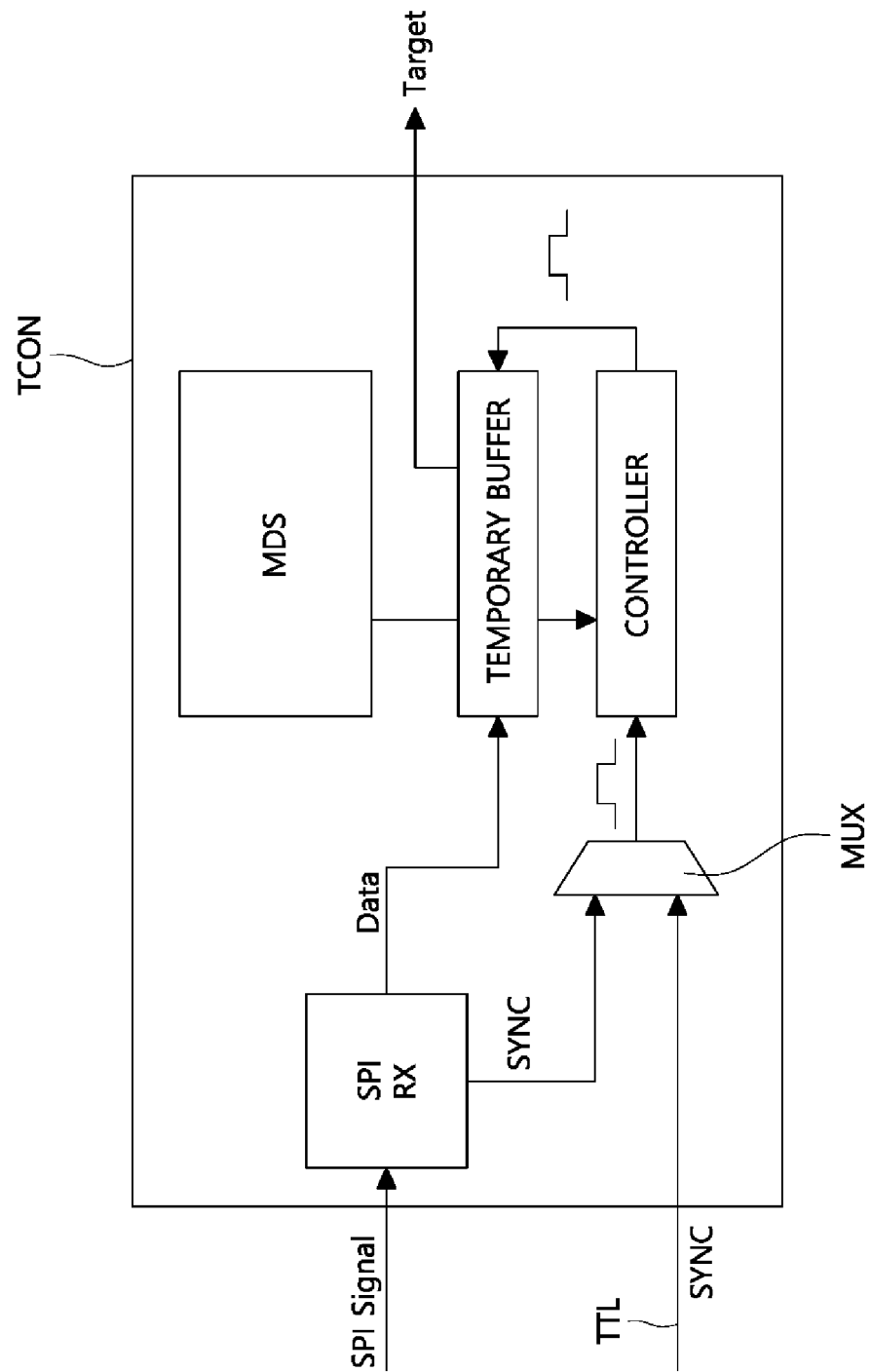
FIG. 20 is a diagram illustrating a configuration of a timing controller for implementing a plurality of communication modes in a tiling display apparatus according to an aspect of the present disclosure.
Figure 21:
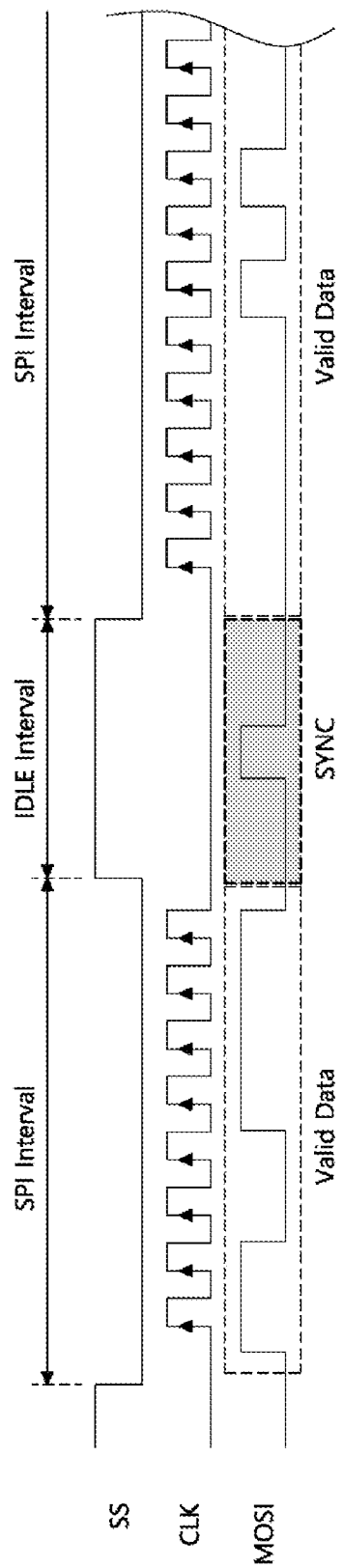
FIG. 21 is a diagram illustrating an implementation example of a multi synchronization signal for implementing the synchronous overlap communication mode in a tiling display apparatus according to an aspect of the present disclosure.

FIG. 20 is a diagram illustrating a configuration of a timing controller for implementing a plurality of communication modes in a tiling display apparatus according to an aspect of the present disclosure. FIG. 21 is a diagram illustrating an implementation example of a multi synchronization signal for implementing the synchronous overlap communication mode in a tiling display apparatus according to an aspect of the present disclosure.

Referring to FIGS. 20 and 21, as in FIG. 8, a multi synchronization signal SYNC may be transferred from a set board SET to a timing controller TCON of each display module through a third interface circuit IF3. In this case, the third interface circuit IF3 may be implemented with a transistor logic (TTL).

The multi synchronization signal SYNC may be transferred from the set board SET to the timing controller TCON of each display module through a MOSI in idle intervals of the first and second interface circuits IF1 and IF2 of FIG. 8. Because a control command signal (shown as valid data of FIG. 21) is transferred to the timing controller TCON of each display module through the MOSI in SPI intervals of the first and second interface circuits IF1 and IF2, the idle interval between the SPI intervals may be used to transfer the multi synchronization signal SYNC. Therefore, a third interface circuit IF3 may be omitted.

Referring to FIG. 20, a timing controller TCON may include an SPI receiver RX connected to one of the first and second interface circuits IF1 and IF2, a multiplexer MUX, a controller, a temporary buffer, and a mode selector MDS.

The mode selector MDS may active one of the bypass communication mode, the synchronous overlap communication mode, and the asynchronous overlap communication mode on the basis of control by the set board SET.

The multiplexer MUX, the controller, and the temporary buffer may be activated in the synchronous overlap communication mode and may be deactivated in the other communication modes.

The temporary buffer may temporarily store control command data received through an SPI.

The multiplexer MUX may select and output one of a multi synchronization signal SYNC received through the third interface circuit IF3 and a multi synchronization signal SYNC received through the first and second interface circuits IF1 and IF2.

The controller may update the control command data, stored in the temporary buffer, in a target memory on the basis of the multi synchronization signal SYNC.

The present aspect may realize the following effects.

In the present aspect, a multi chain interface having a feedback loop type may be configured between adjacent display modules so that a set board individually controls a plurality of display modules connected to one another at a long distance and massive communication having reliability is implemented. That is, according to the present aspect, the plurality of display modules may be connected to one another through a dual SPI capable of bidirectional communication therebetween.

According to the present aspect, because each display module includes all of a master port and a slave port for a bidirectional dual SPI, all of a write function and a read function may be performed, and thus, convenience may increase and maintenance and repair may be easy.

According to the present aspect, because each display module includes all of the master port and the slave port for the bidirectional dual SPI, individual bidirectional communication may be performed between adjacent display modules, and a short communication line may be secured. According to the present aspect, despite an increase in the number of tiled display modules, a module selection pin may not be added to the set board and a connection line between the set board and the display module may not be added, and thus, screen expandability may be easy.

According to the present aspect, because an individual feedback bidirectional communication is performed between display modules through a short communication line, the reliability and speed of massive data communication may be enhanced.

According to the present aspect, because an individual feedback bidirectional communication is performed between display modules through a short communication line, synchronization between a clock and data may be maintained, and data reliability may be considerably enhanced.

According to the present aspect, based on a bypass communication scheme, an access speed up to a target display module from the set board may be almost equal regardless of a position of the target display module, and thus, a data communication time may be reduced.

According to the present aspect, the set board may almost simultaneously perform massive data communication with all display modules on the basis of an overlap communication scheme, and thus, a data communication time may be considerably reduced.

According to the present aspect, an execution time of a target operation may match in all display modules because a multi synchronization signal is further applied to the overlap communication scheme, and thus, screen flickers caused by a communication time difference may be effectively prevented.

The effects according to the present disclosure are not limited to the above examples, and other various effects may be included in the specification.

It will be apparent to those skilled in the art that various modifications and variations can be made in the tiling display apparatus of the present disclosure without departing from the spirit or scope of the aspects of the present disclosure. Thus, it is intended that the present disclosure covers the modifications and variations of the aspects provided they come within the scope of the appended claims and their equivalents.

What is claimed is:
1. A tiling display apparatus comprising:
a set board; and
a plurality of display modules each including a timing controller connected to one or more display panels,
wherein the display modules are connected to each other through a first interface circuit,
wherein any one of the display modules is further connected to the set board through a second interface circuit,
wherein the first interface circuit is implemented with a bidirectional serial interface having a feedback loop type,
wherein the second interface circuit is implemented with a unidirectional serial interface,
wherein each of the plurality of display modules includes a first master port, a first slave port, a second master port and a second slave port,
wherein the first master port and the first slave port are connected to each other to transmit a control command signal for executing a target operation to an adjacent display module in a first direction,
wherein the second master port and the second slave port are connected to each other to transmit a control response signal including a target operation execution result to an adjacent display module in a second direction, and
wherein the first direction and the second direction are opposite to each other to implement the bidirectional serial interface having a feedback loop type.

2. The tiling display apparatus of claim 1, wherein the display modules are adjacent to each other to correspond to an order of connection through the first interface circuit.

3. The tiling display apparatus of claim 1, wherein the display modules are further connected to each other through a third interface circuit, and
each of the plurality of display modules transfers image data for displaying an input image to an adjacent display module through the third interface circuit.

4. The tiling display apparatus of claim 3, wherein the first interface circuit and the third interface circuit are physically and electrically separated from each other.

5. The tiling display apparatus of claim 3, wherein the first interface circuit and the third interface circuit include different cables that are physically and electrically separated from each other.

6. The tiling display apparatus of claim 3, wherein the first interface circuit is implemented as a dual serial peripheral interface (SPI), and
wherein the third interface circuit is implemented as V-by-one (Vx1) interface.

7. The tiling display apparatus of claim 1, wherein the display panel includes a plurality of pixels, and
wherein each of the pixels includes a micro light emitting diode as a light emitting device.

* * * * *